US008272051B1

(12) United States Patent
Zhao et al.

(10) Patent No.: US 8,272,051 B1
(45) Date of Patent: Sep. 18, 2012

(54) METHOD AND APPARATUS OF INFORMATION LEAKAGE PREVENTION FOR DATABASE TABLES

(75) Inventors: Xiaoming Zhao, Jiangsu (CN); Gang Chen, Jiangsu (CN); Kan Dong, Jiansu (CN)

(73) Assignee: Trend Micro Incorporated, Tokyo (JP)

( * ) Notice: Subject to any disclaimer, the term of this patent is extended or adjusted under 35 U.S.C. 154(b) by 1210 days.

(21) Appl. No.: 12/056,923

(22) Filed: Mar. 27, 2008

(51) Int. Cl.
*H04L 29/06* (2006.01)
(52) U.S. Cl. ............. 726/22; 726/13; 713/153; 713/154
(58) Field of Classification Search .......... 713/151–154, 713/164–167; 726/13, 22–26
See application file for complete search history.

(56) References Cited

U.S. PATENT DOCUMENTS

| 7,454,418 | B1* | 11/2008 | Wang ................................. 1/1 |
| 7,673,344 | B1* | 3/2010 | Rowney et al. .................. 726/26 |
| 2005/0027723 | A1* | 2/2005 | Jones et al. ..................... 707/100 |
| 2006/0005247 | A1* | 1/2006 | Zhang et al. .................... 726/26 |
| 2007/0110089 | A1* | 5/2007 | Essafi et al. ..................... 370/420 |
| 2008/0059536 | A1* | 3/2008 | Brock et al. .................. 707/200 |
| 2008/0140662 | A1* | 6/2008 | Pandya ............................. 707/6 |

OTHER PUBLICATIONS

Saul Schleimer, et al., "Winnowing: Local Algorithms for Documents Fingerprinting" Jun. 2003 SIGMOD, 10 pgs, Copyright 2003 ACM 1-58113-634-X/03/06.
Li Fan, et al., "Summary Cache: A Scalable Wide-Area Web Cache Sharing Protocol", Jun. 2000, pp. 281-293, vol. 8, No. 3, IEEE/ACM Transactions on Networking.

* cited by examiner

*Primary Examiner* — Eleni Shiferaw
*Assistant Examiner* — Hilary Branske
(74) *Attorney, Agent, or Firm* — Okamoto & Benedicto LLP

(57) ABSTRACT

A process of information leakage prevention for sensitive information in a database table. Content to be inspected is extracted at a deployment point. The content is processed by a first fingerprinting module to determine if the content matches fingerprint signatures generated from database cells between a first threshold size and a second threshold size which is larger than the first threshold size. The content is also processed by a second fingerprinting module to determine if the content matches fingerprint signatures generated from database cells larger than the second threshold size. The content may also be filtered, and the filtered content processed with an exact match module to determine if the filtered content exactly matches data from cells smaller than the first threshold size. Other embodiments, aspects and features are also disclosed.

13 Claims, 5 Drawing Sheets

METHOD AND APPARATUS OF INFORMATION LEAKAGE PREVENTION FOR DATABASE TABLES

BACKGROUND

1. Field of Art

The present disclosure generally relates to the fields of information security and computer software. More specifically, it relates to the field of information leakage prevention.

2. Description of the Related Art

Information leakage prevention (ILP) systems are becoming more important for enterprise computing systems. Serious information leakage accidents have caused substantial losses and have damaged corporate images. Such accidents currently occur one after the other. In addition, regulations promulgated by governments require enterprises to properly protect their digital information from leaking.

SUMMARY

One embodiment relates to a process of information leakage prevention for sensitive information in a database table. Content to be inspected is extracted at a deployment point. The content is processed by a first fingerprinting module to determine if the content matches fingerprint signatures generated from database cells between a first threshold size and a second threshold size which is larger than the first threshold size. The content is also processed by a second fingerprinting module to determine if the content matches fingerprint signatures generated from database cells larger than the second threshold size.

In accordance with another embodiment, the content is filtered, and the filtered content is processed with an exact match module to determine if the filtered content exactly matches data from cells smaller than a first threshold size. If a match is found by the exact match module, then a determination is made as to whether an information leakage rule is satisfied. If an information leakage rule is satisfied, then an information leakage event is triggered.

In accordance with another embodiment, information leakage rules are defined, each information leakage rule having an information definition and a leakage definition. Appropriate data is retrieved from the database based on sensitive information defined by the information leakage rules, and signatures are generated from the retrieved data. Data being exchanged via a deployment point is extracted, and matching is performed using said signatures to detect potential leakage. If potential leakage is detected, then said information leakage rules are applied to determine if all elements of a leakage definition are satisfied.

Other embodiments, aspects and features are also disclosed.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

Problems with Existing ILP Technologies

There are various information leakage prevention (ILP) technologies in existence today. These technologies include content fingerprinting, regular expression, keywords matching, and others. However, as discussed herein, applicants believe that direct use of these technologies is insufficient or problematic in protecting sensitive data in databases.

Regarding content fingerprinting, this technology is suitable for protecting sensitive document files. Content fingerprinting extracts small "fingerprints" from large documents and detects a partial document leak by comparing fingerprints. Unfortunately, since there are typically a very large number of small cells in a database table, content fingerprinting is impractical and unsuited for protecting against leaks of database cell level information.

Regular expressions are usually used to detect leakage of structured information (i.e. information with a well defined structural pattern). Examples of structured information include credit card numbers, social security numbers, and so on. However, database information is typically more varied and general. Regular expressions are ill-suited for preventing the leakage of non-structured sensitive information.

In keyword matching, a group of sensitive keywords are defined by a (human) user and these keywords are searched for and detected. Keyword matching is a very limited solution and has substantial potential for a high false alarm rate.

A previous solution to protect data in a database is based on access control lists. This solution is suited for preventing sensitive data from being stolen from a database by an unauthorized user (i.e. a user which is not authorized to access the data according to the access control list). However, this solution is poorly suited for preventing sensitive information from being leaked by an authorized user after he/she retrieves the information from the database. For example, a manager of a bank may perform a query on a customer database, and then let the results of the query be attached to an electronic mail message. In general, that may be a legitimate behavior or set of actions. However, suppose that the manager happens to fill in a wrong recipient's address (i.e. a recipient without authorization to receive the data). In that case, the sensitive information would be leaked to an unauthorized recipient who does not have access rights to the data.

Preventing Information Leakage from Database Tables

An embodiment of the present invention targets the protection of all kinds of data residing in a database. The technique disclosed herein is capable of detecting leakage from a database table at an individual cell level. In addition, the technique disclosed herein provides for further accuracy in identifying information leakage by defining cell-leakage combinations.

Figure 1:
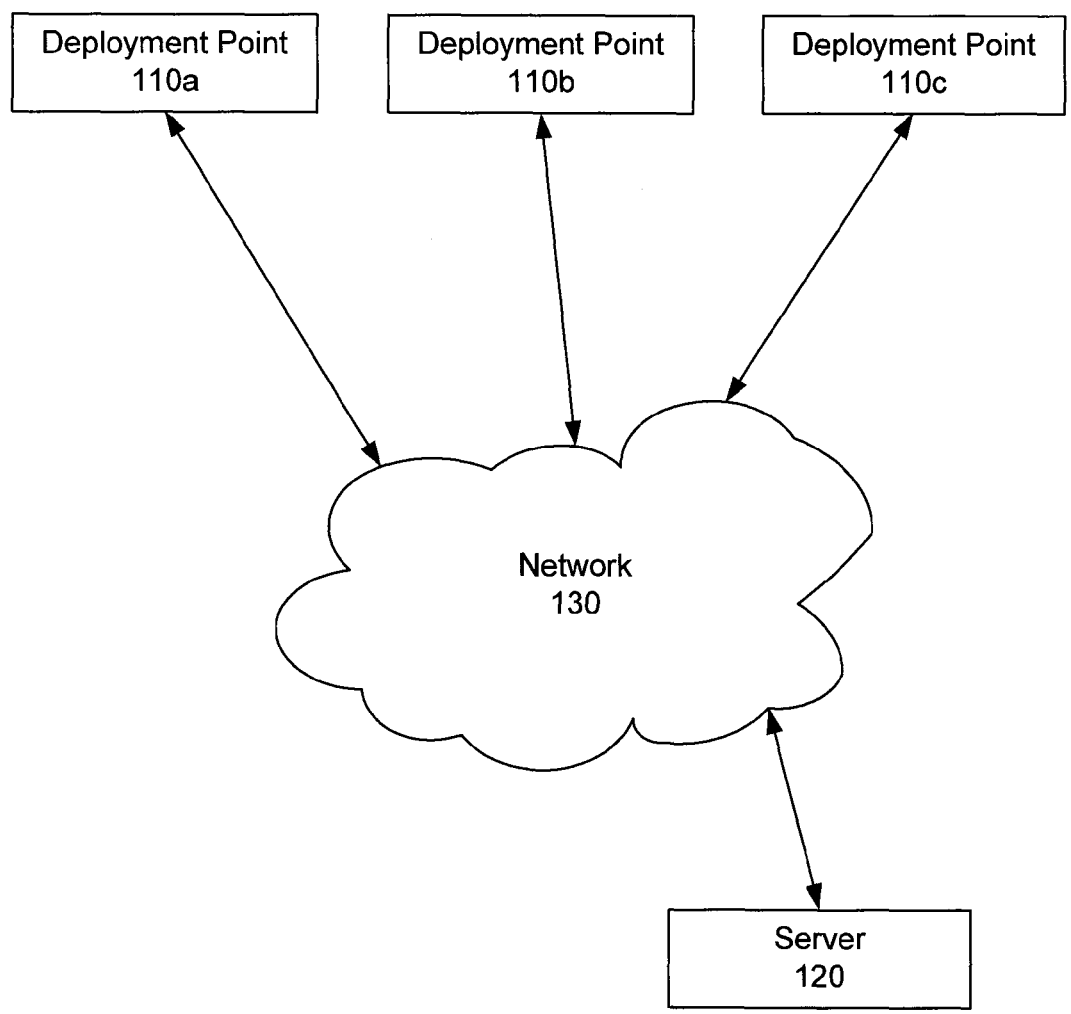
FIG. 1 is a high-level schematic diagram of an enterprise sensitive information management system in accordance with an embodiment of the present invention.

FIG. 1 is a high-level schematic diagram of an enterprise sensitive information management system 100 in accordance with an embodiment of the present invention. The system 100 monitors and manages sensitive information in an enterprise network. The system 100 includes deployment points 110a-c and a server 120. Each of the deployment points 110 can be a computer (e.g., laptop computers, desktop computers), or a device with data access capabilities (e.g., handheld computing devices, embedded devices with a processor and operating or control system), or a network appliance or device through which network traffic flows and may be inspected (e.g., a network gateway, etc.). The server 120 is a computing device that, in accordance with an embodiment of the invention, may perform a signature deployment process. In the signature generation process, generated signatures are distributed from the server 120 to the deployment points 110.

The deployment points 110 and the server 120 are connected through a network 130. The network 130 may be a wired or wireless network or a combination thereof. Examples of the network 130 include the Internet, an intranet, a cellular network, or a combination thereof. It is noted that each of the deployment points 110 and the server 120 are structured to include a processor, memory, storage, network interfaces, and applicable operating system and other functional software (e.g., network drivers, communication protocols, etc.).

Figure 2:
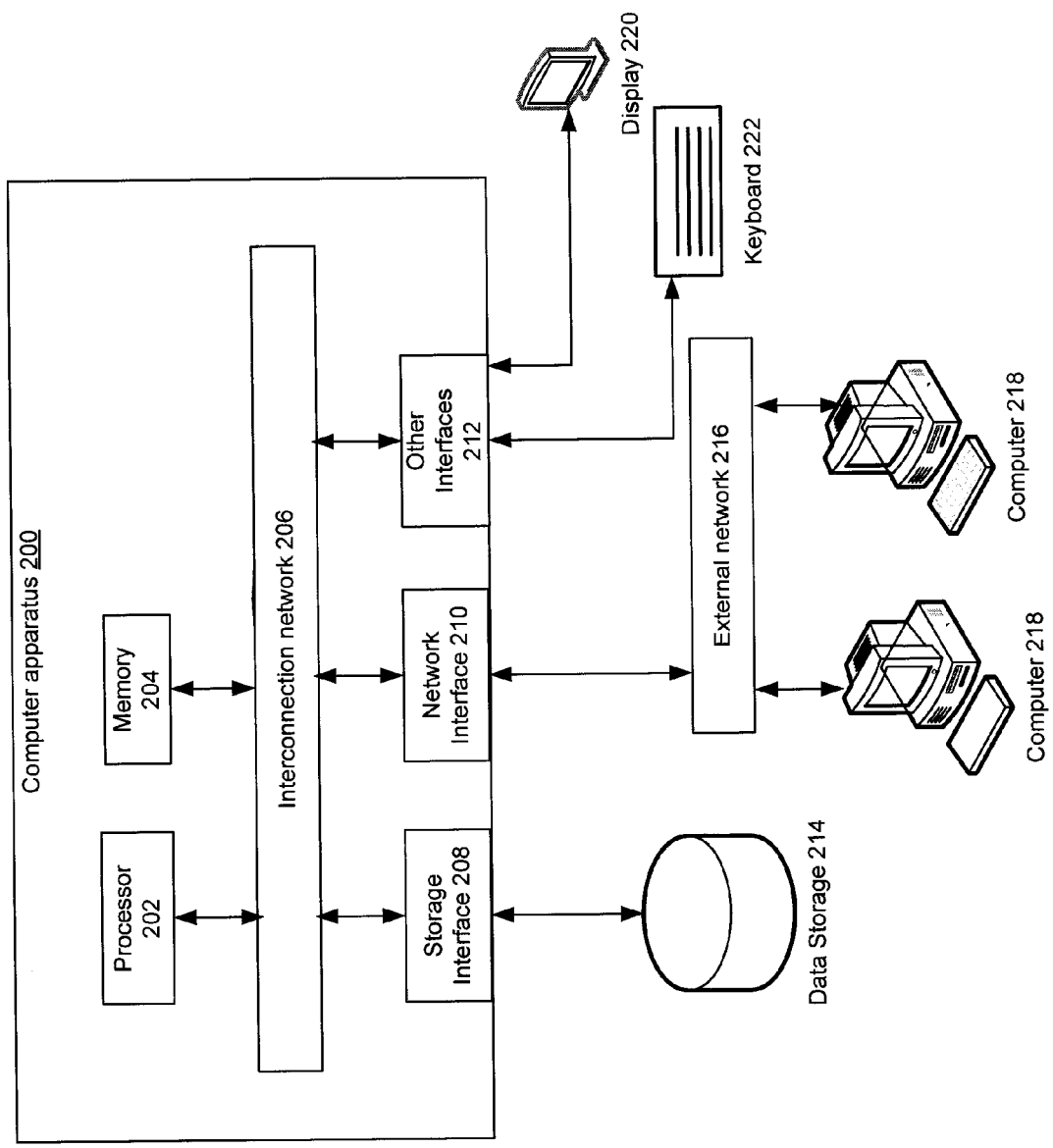
FIG. 2 is a schematic diagram depicting an example computer apparatus which may be configured to perform various method steps in accordance with an embodiment of the invention.

FIG. 2 is a schematic diagram depicting an example computer apparatus 200 which may be configured to perform various method steps in accordance with an embodiment of the invention. Other designs for the computer apparatus may be used in alternate embodiments. As discussed above, embodiments of the present invention may be performed by multiple computer apparatus 200 communicatively interconnected by a network.

As shown in FIG. 2, the computer apparatus 200 comprises a processor 202, a computer-readable memory system 204, a storage interface 208, a network interface 210, and other interfaces 212. These system components are interconnected through the use of an interconnection network (such as a system bus or other interconnection system) 206. The memory 204 may be configured to include, in addition to other components and data, processor-executable instructions to perform various method steps disclosed herein.

The storage interface 208 may be used to connect storage devices 214 to the computer apparatus 200. The network interface 210 may be used to communicate with other computers 218 by way of an external network 216. The other interfaces may interface to various devices, for example, a display 220, a keyboard 222, and other devices.

Figure 3:
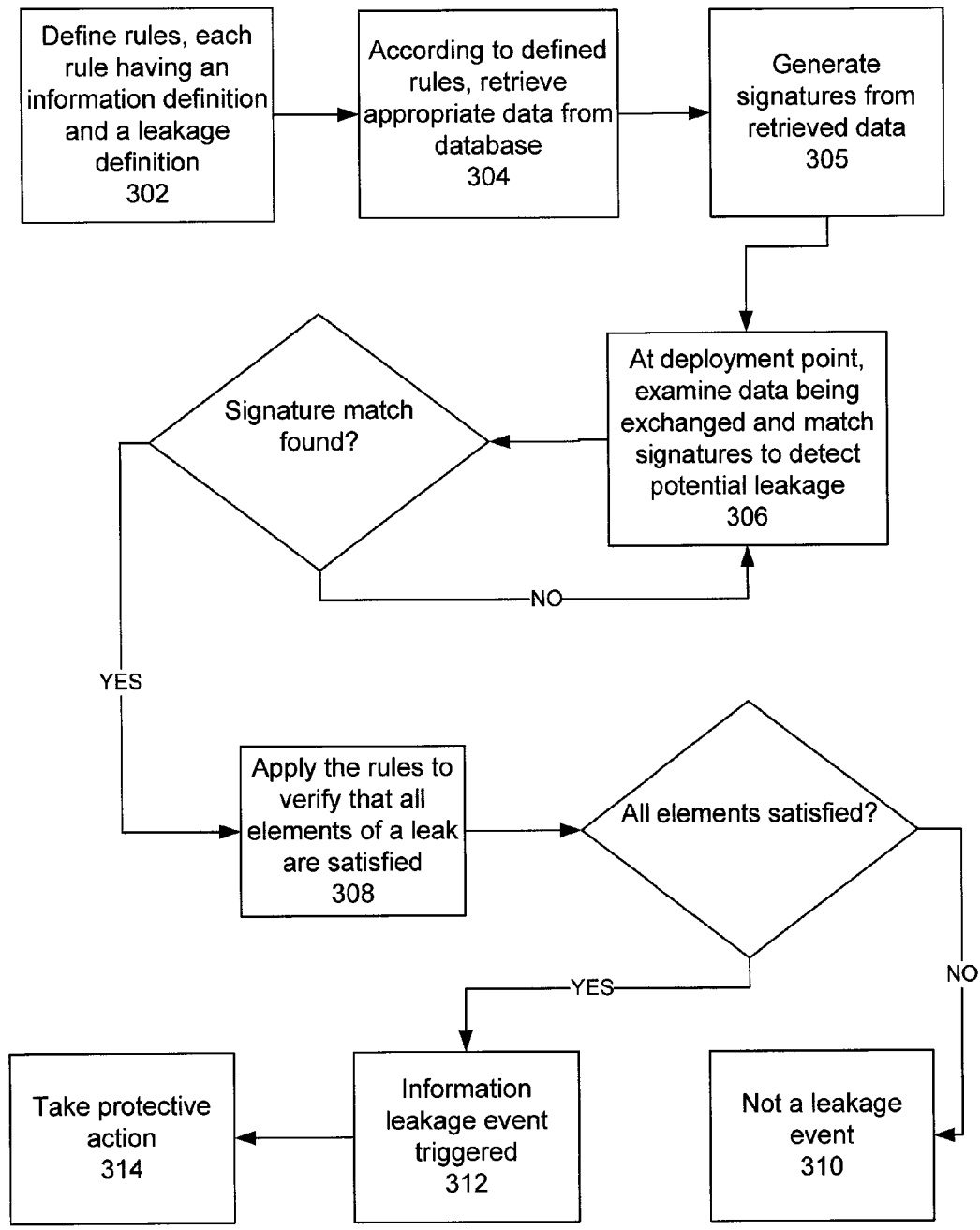
FIG. 3 is a flow chart depicting a method of preventing information leakage from a database table in accordance with an embodiment of the invention.

FIG. 3 is a flow chart depicting a method 300 of preventing information leakage from a database table in accordance with an embodiment of the invention. The method 300 may be performed by executing appropriately configured computer-readable instructions, for example, at a server 120 and deployment points 110 of an enterprise sensitive-information management system 100.

In step 302, rules for information leakage are defined. This rule definition step may be performed, for example, by a user at a server 120. In a preferred embodiment, there are two parts to a rule: the "information definition" part; and the "leakage definition" part.

The "information definition" part of the rule identifies and classifies information in the database table. For example, consider a database table which may be referred to as "customer_db". Data under the column "name" in the database table may be defined as user_name information. Data under the "telephone" and "address" columns may be defined as user_contact information. And so on.

The "leakage definition" part of the rule characterizes what constitutes an information leak. For example, a customer_info_leak may be defined as requiring both user_name data and user_contact data (both previously defined) to appear more than 3 times in the content being inspected.

In step 304, data is retrieved from the database table to be protected. This step may be performed, for example, by a server 120. The data retrieved is appropriate given the defined rules. The appropriate data is the data that is needed to apply the rules. For instance, given the example rule definitions discussed above, the appropriate data to retrieve includes the data under the "name", "telephone" and "address" columns of customer_db. In one embodiment, this step may be performed by a "crawler" application which is executed and extracts all the data to be protected in the database according to the rule definitions.

In step 305, signatures may be generated for the retrieved data. This step may also be performed, for example, by a server 120. The signature generation may be performed on a cell-by-cell basis. In accordance with an embodiment of the invention, different sets and types of signatures may be generating depending upon the contents of the cell. An exemplary method 400 for generating a signature for a database cell is described in detail below in relation to the flow chart of FIG. 4.

In step 306, data being exchanged or communicated is examined, and signature matching is performed to detect information leakage. This step may also be performed, for example, at a deployment point 110. For instance, an ILP application may be deployed at an electronic mail gateway at the deployment point 110. The ILP application may be configured to intercept all electronic mail traffic, extract payloads from the mail messages, and perform the signature matching on the extracted payloads. An exemplary method for performing the signature matching on the extracted content is described below in relation to the schematic diagram of FIG. 5.

If a signature match is found, it means that one or more database cell is leaking some information. However, according to an embodiment of the invention, after a signature match is found, further criteria are examined to check the leakage definitions to see whether all elements of a defined leak are satisfied. In other words, the signature match alone is insufficient to trigger an information leakage event. The elements of a leakage definition must also be satisfied to trigger an information leakage event. In particular, after a signature match is found, the previously-defined rules are applied 308 to determine whether all elements of any leakage definition are satisfied. If not, then no information leakage event is triggered 310. If so, then an information leakage event is triggered 312. Such an information leakage event must satisfy all elements of at least one leakage definition.

Upon triggering of an information leakage event, protective action 314 may be taken. For example, the information leakage event may be logged, and the information sender and receiver may be checked to see if they are on a predefined white list. If they are not, then the transport stream with the information may be blocked at the deployment point 110.

Figure 4:
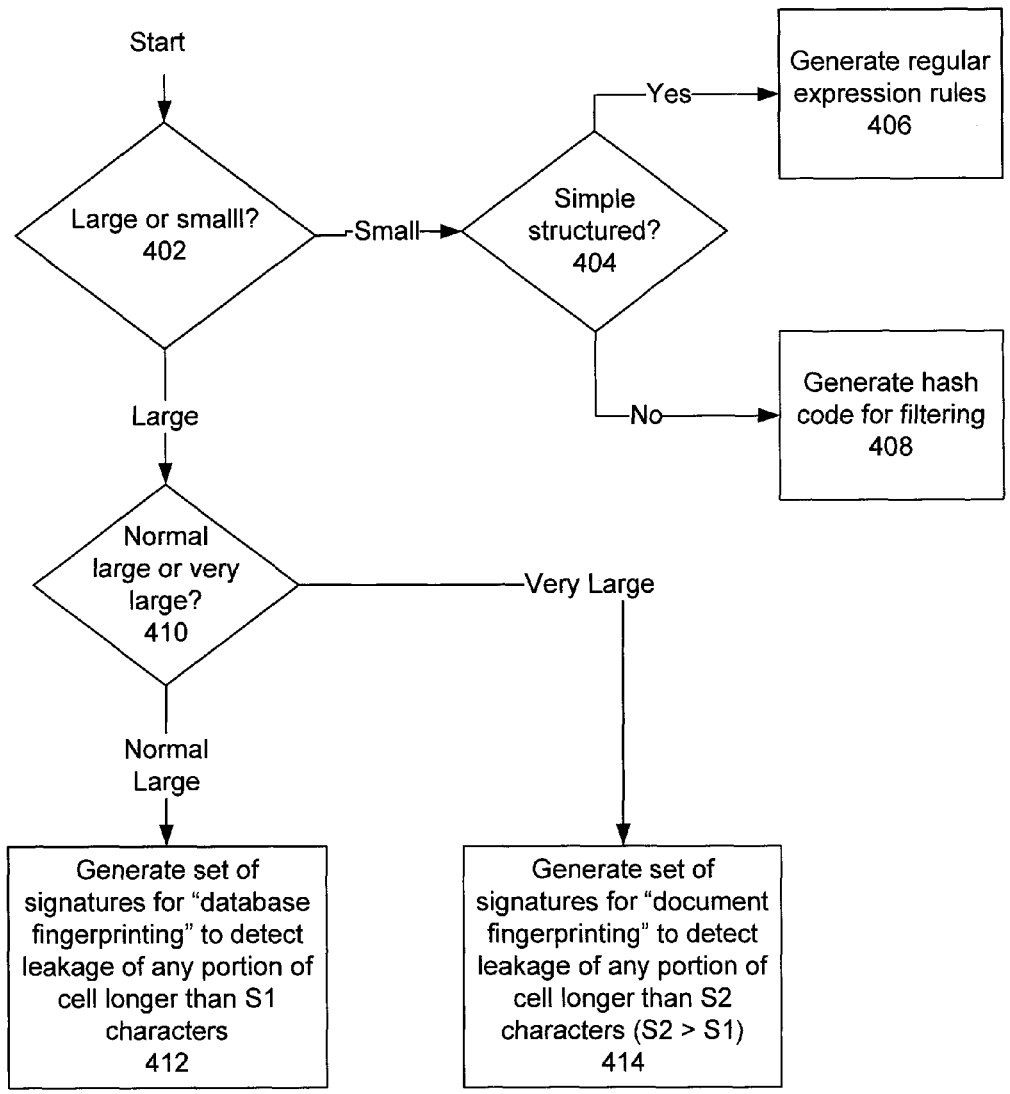
FIG. 4 is a flow chart illustrating a method of signature production for a cell of a database table in accordance with an embodiment of the invention.

FIG. 4 is a flow chart illustrating a method 400 of signature production for a cell of a database table in accordance with an embodiment of the invention. This method 400 applies different signature generation techniques depending on the contents of a database cell.

First, a determination 402 may be made as to whether a size of a database cell or field is small or large. A first threshold size may be used to distinguish between small and large cells. In other words, cells having a data section smaller than the first threshold size may be categorized as small, and cells having a data section equal to or larger than the first threshold size may be categorized as large. For example, the first threshold size may be 100 (one hundred) bytes or another number of bytes.

If the cell is categorized as small, then a secondary determination 404 may be made as to whether or not the cell is a simple structured field. Examples of simple structured fields include credit card numbers, social security numbers, other fixed length identification numbers, and other similar fields with a simple and well-defined structure.

If the small cell is a simple structured field, then regular expression rules are generated 406. Regular expression rules are well-suited to detect leakage of structured information.

On the other hand, if the small cell is not a simple structured field, then a hash code may be generated 408. Such a hash code may be used for hash filtering, as discussed further below in relation to FIG. 5.

On the other hand, if the cell is categorized as large, then a secondary determination 410 may be made as to whether the size of a database cell or field is "normal large" or "very large." A second threshold size may be used to distinguish between these two categories of large cells. In other words, cells having a data section smaller than the second threshold size may be categorized as normal large, and cells having a data section equal to or larger than the second threshold size may be categorized as very large. For example, the second threshold size may be 300 (three hundred) bytes or another number of bytes which is larger than the first threshold size.

If the cell is categorized as normal large, then a set of signatures for "database fingerprinting" may be generated 412. Such a set of signatures may be generated so as to detect leakage of any portion of a cell longer than S1 characters, where S1 is a first parameter representing a length of a detectable data segment. For example, S1 may be equal to 100 (one hundred) bytes if a normal large cell is defined as being between 100 and 300 bytes in size.

On the other hand, if the cell is categorized as very large, then a set of signatures for "document fingerprinting" may be generated 414. Such a set of signatures may be generated so as to detect leakage of any portion of a cell longer than S2 characters, where S2 is a second parameter representing a length of a detectable data segment, and where S2 is greater than S1. For example, S2 may be equal to 300 (three hundred) bytes if a very large cell is defined as being over 300 bytes in size. Note that because S2 is larger than S1, the set of signatures generated for document fingerprinting is less dense than the set of signatures generated for database fingerprinting. In other words, if applied to the same document contents, a fingerprinting engine with parameter S2 will produce a smaller number of signatures than a same fingerprinting engine with parameter S1.

While the above-described embodiment uses two categories of large cells (normal large and very large), other embodiments may classify large cells into a different number of classifications. For example, three large classification sizes may be used: normal large for cells between 100 and 300 bytes, very large for cells between 300 and 1,000 bytes, and extremely large for cells over 1,000 bytes in size. In that case, three parameters S1, S2, and S3 may be used, where S1=100 bytes, S2=300 bytes, and S3=1,000 bytes, for example.

An algorithm which may be used to generate the sets of signatures discussed above is described, for example, in "Winnowing: Local Algorithms for Document Fingerprinting," Saul Schleimer, Daniel S. Wilkerson, and Alex Aiken, SIGMOD 2003, San Diego, Calif., Jun. 9-12, 2003, which is hereby incorporated by reference. The Winnowing algorithm described has a minimum match size parameter S, which is equal to K+W−1, where K is the k-gram size and W is the windows size. The Winnowing algorithm guarantees to produce at least one fingerprint for any data section longer than S.

Figure 5:
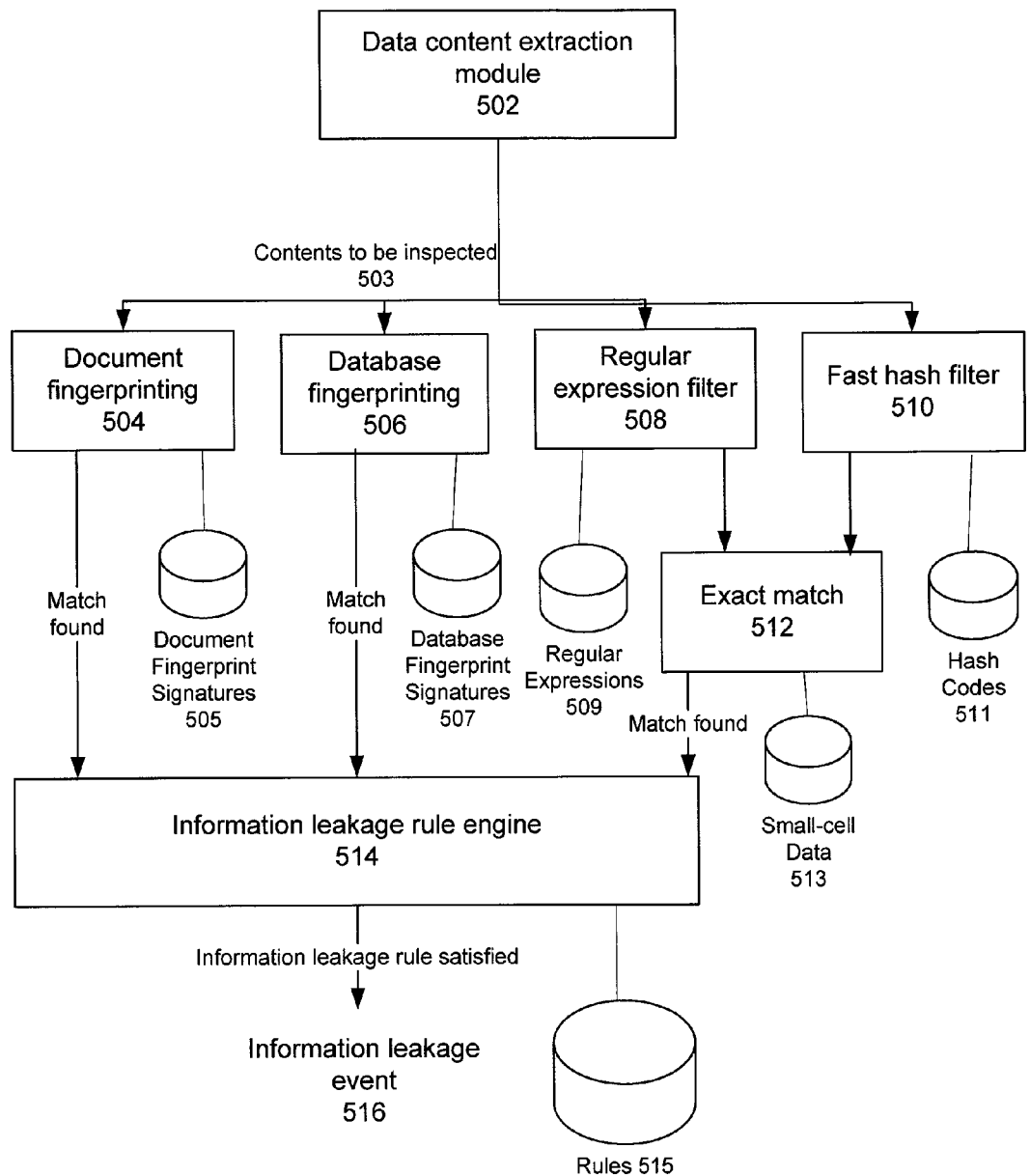
FIG. 5 is a schematic diagram depicting a process for signature matching in accordance with an embodiment of the invention.

FIG. 5 is a schematic diagram depicting a process for signature matching in accordance with an embodiment of the invention. The process may be performed, for example, at each deployment point 110 to protect sensitive information from leaking.

At the top of FIG. 5, a data content extraction module 502 is shown which extracts contents or data 503 to be inspected. The contents 503 may be extracted from data being exchanged via an interface at a deployment point 110. In accordance with an embodiment of the invention, the contents 503 may be sent to various modules (document fingerprinting 504, database fingerprinting 506, regular expression filter 508, and fast hash prefilter 510) in parallel.

The document fingerprinting module 504 performs signature matching using the sets of signatures 505 generated 414 for "document fingerprinting" as discussed above in relation to "very large" size cells. This "document fingerprinting" signature matching detects the leakage of any portion longer than S2 bytes of a "very large" cell. Any match found by the document fingerprinting module 504 is communicated to the information leakage rule engine 514.

Similarly, the database fingerprinting module 506 performs signature matching using the sets of signatures 507 generated 412 for "database fingerprinting" as discussed above in relation to "normal large" size cells. This "database fingerprinting" signature matching detects the leakage of any portion longer than S1 bytes of a "normal large" cell. Any match found by the database fingerprinting module 506 is also communicated to the information leakage rule engine 514.

The regular expression filter 508 filters the contents to be inspected by the regular expression rules 509 generated 406 for each of the small structured fields as discussed above in relation to FIG. 4. Only data fractions passing the regular expression match will be submitted to the exact match module 512. Data not in the form of the regular expression rules (i.e. not in the form of the simple structures) will be filtered out and so reduce the matching operations needing to be performed by the exact match module 512.

The fast hash filter 510 filters the contents to be inspected using the hash codes 511 generated 408 as discussed above in relation to FIG. 4. Only data fractions passing the hash filtering will be submitted to the exact match module 512. Data not passing the hash filter will be filtered out and so further reduce the matching operations needing to be performed by the exact match module 512. In one embodiment, the fast hash filter 510 may be implemented as a Bloom filter.

The exact match module 512 receives the filtered data from the regular expression filter 508 and the fast hash filter 510. The exact match module 512 performs an exact matching comparison between the filtered data and the small-cell data 513 (i.e. the sensitive information categorized as being from the small-sized cells). Any match found by the exact match module 512 is also communicated to the information leakage rule engine 514.

The information leakage rule engine 514 receives matches found by the document fingerprinting module 504, the database fingerprinting module 506, and the exact match module 512. The information leakage rule engine 514 applies 308 the previously-defined information leakage rules which are discussed above in relation to step 302 of FIG. 3. If all elements of any information leakage rule are satisfied, then an information leakage event 514 is triggered.

For example, as discussed above, a customer_info_leak may be defined as requiring both user_name data and user_contact data (both previously defined) to appear more than three times in the content being inspected. Hence, if user_name data and user_contact data appear only one or two times in the content being inspected, then this leakage rule is not satisfied and no information leakage event 514 would be triggered based on this information leakage rule. However, if user_name data and user_contact data appear three or more times in the content being inspected, then this leakage rule is satisfied and an information leakage event 514 would be triggered based on this information leakage rule.

Conclusion

The features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Upon reading this disclosure, those of skill in the art will appreciate still additional alternative structural and functional designs for a system and a process for a matching engine to query relevant documents, which may include a signature generation and relevance detection through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A process of information leakage prevention for sensitive information in a database table, the process comprising:
   extracting, by computer, content to be inspected at a deployment point;
   processing the content by computer-readable instructions of a first fingerprinting module to determine if the content matches fingerprint signatures that are generated from database cells which have cell sizes between a first threshold size and a second threshold size, wherein the second threshold size is larger than the first threshold size; and
   processing the content by computer-readable instructions of a second fingerprinting module to determine if the content matches fingerprint signatures that are generated from database cells which have cell sizes larger than the second threshold size.

2. The process of claim 1, further comprising:
   if a match is found by either the first or second fingerprinting modules, then determining if an information leakage rule is satisfied; and
   if an information leakage rule is satisfied, then triggering, by computer, an information leakage event.

3. The process of claim 1, further comprising:
   filtering the content by computer; and
   after filtering the content, processing the filtered content with computer-readable instructions of an exact match module to determine if the filtered content exactly matches data from cells smaller than the first threshold size.

4. The process of claim 3, further comprising:
   if a match is found by either the first fingerprinting module, or the second fingerprinting module, or the exact match module, then determining, by computer, if an information leakage rule is satisfied; and
   if an information leakage rule is satisfied, then triggering, by computer, an information leakage event.

5. The process of claim 3, wherein filtering the content comprises applying a regular expression filter.

6. The process of claim 5, wherein the regular expression filter uses regular expressions generated from structured database cells.

7. The process of claim 3, wherein filtering the content comprises applying a hash filter.

8. A process of information leakage prevention for sensitive information in a database table, the process comprising:
   extracting, by computer, content to be inspected at a deployment point;
   filtering the content by computer;
   after filtering the content, processing the filtered content with an exact match module implemented with computer-readable instructions to determine if the filtered content exactly matches data from cells smaller than a first threshold size;
   if a match is found by the exact match module, then determining, by computer, if an information leakage rule is satisfied; and
   if an information leakage rule is satisfied, then triggering, by computer, an information leakage event.

9. The process of claim 8, wherein filtering the content comprises applying a regular expression filter.

10. The process of claim 9, wherein the regular expression filter uses regular expressions generated from structured database cells.

11. The process of claim 8, wherein filtering the content comprises applying a hash filter.

12. The process of claim 11, wherein the hash filter comprises a Bloom filter.

13. A computer apparatus comprising:
   a processor configured to execute computer-readable instructions;
   memory configured to store data, including said computer-readable instructions; and
   a communications system interconnecting said processor and memory,
   wherein said computer-readable instructions are configured to
      extract content to be inspected at a deployment point;
      process the content by a first fingerprinting module to determine if the content matches fingerprint signatures generated from database cells which have cell sizes between a first threshold size and a second threshold size, wherein the second threshold size is larger than the first threshold size;
      process the content by a second fingerprinting module to determine if the content matches fingerprint signatures generated from database cells which have cell sizes larger than the second threshold size;
      if a match is found by either the first or second fingerprinting modules, then determining if an information leakage rule is satisfied; and
      if an information leakage rule is satisfied, then triggering an information leakage event.

* * * * *